United States Patent [19]

Geiger

[11] Patent Number: 5,958,803
[45] Date of Patent: Sep. 28, 1999

[54] ENVIRONMENTAL COATING FOR AN ELASTOMER PANEL

[75] Inventor: Michael Watson Geiger, St. Louis, Mo.

[73] Assignee: McDonnell Douglas

[21] Appl. No.: 08/818,108

[22] Filed: Mar. 13, 1997

Related U.S. Application Data

[63] Continuation-in-part of application No. 08/718,771, Sep. 24, 1996.
[51] Int. Cl.$^6$ ........................................... B32B 27/12
[52] U.S. Cl. ........................... 442/71; 442/180; 442/117; 442/304; 442/317
[58] Field of Search .................................. 442/304, 317, 442/117, 110, 71, 180

[56] References Cited

U.S. PATENT DOCUMENTS

| | | | |
|---|---|---|---|
| 4,737,527 | 4/1988 | Maranci | 53/205 |
| 5,222,699 | 6/1993 | Albach et al. | 244/213 |

Primary Examiner—Timothy Speer
Assistant Examiner—Cathy Lam
Attorney, Agent, or Firm—Dale B. Halling

[57] ABSTRACT

An environmental cover (50) for a reinforced elastomer panel (70) has a knit fabric (82) covered with an electrically conductive material. An environmental calendared sheet (84) is attached to a first surface of the knit fabric (82) and an elastomer calendared sheet (80) is applied to a second surface of the knit fabric (82).

9 Claims, 4 Drawing Sheets

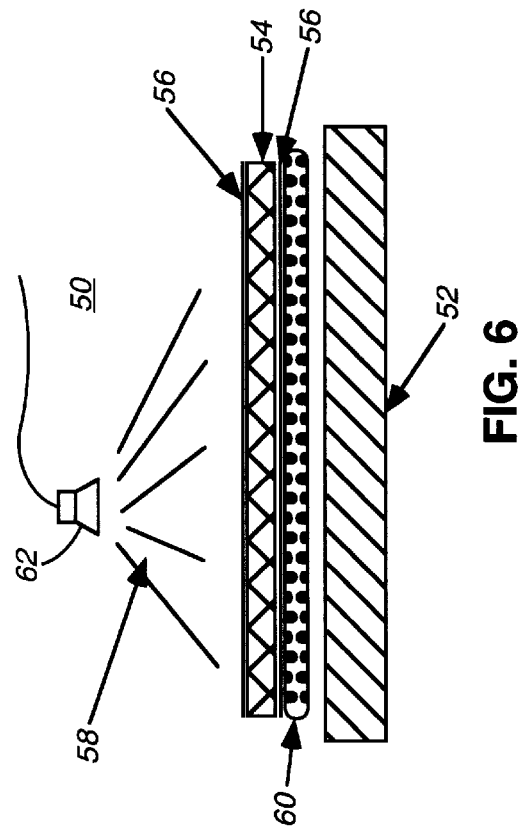
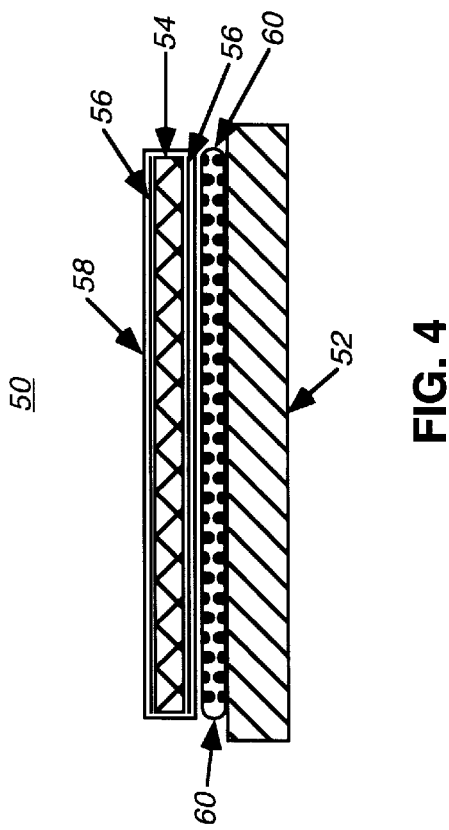
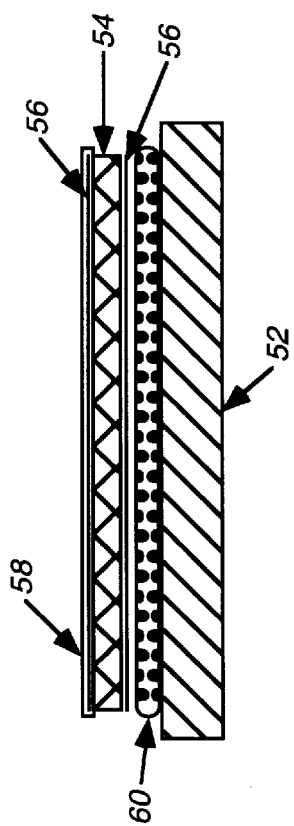

ENVIRONMENTAL COATING FOR AN ELASTOMER PANEL

RELATED PATENTS

This patent application is a continuation in part of the patent application, Ser. No. 08/718,771, filed Sep. 24, 1996, entitled "Elastic Ground Plane and Method", assigned to the same assignee as the present application.

FIELD OF THE INVENTION

The present invention relates generally to the field of elastomer panels and more particularly to an environmental coating for an elastomer panel.

BACKGROUND OF THE INVENTION

Reinforced elastomer panels present an opportunity to improve upon many of the performance characteristics of aircraft and missiles. FIG. 1 shows a side view of a rod reinforced elastomer panel 10 of the prior art. The rod reinforced elastomer 10 has a pair of rod blocks 12. A plurality of rods 14 anchored to one of the pair of rod blocks 12 slide inside an elastomer panel 16. The rod reinforced elastomer 10 is capable of both elongation and deflection, as shown in FIG. 3. The rod reinforced elastomer has a resting length 22 that can be stretched to an elongated length 24 and deflected a distance 26. These products can be used in applications such as control surfaces and in expandable bays to provide cleaner airflow and reduced drag. However, these products so far have been limited to nonmetallic elastomeric compounds that provide little to no protection against electromagnetic interference (EMI). In addition, these products are susceptible to being damaged by solvents such as jet fuel.

Thus there exist a need for an environmental coating that protects the elastomer panel from solvents and EMI.

SUMMARY OF THE INVENTION

An environmental cover for a reinforced elastomer panel that overcomes these and other problems has a knit fabric covered with an electrically conductive material. An environmental calendared sheet is attached to a first surface of the knit fabric and an elastomer calendared sheet is applied to a second surface of the knit fabric.

BRIEF DESCRIPTION OF THE DRAWINGS

FIG. 4 is a side view of an embodiment of an envirommnental coating applied to an elastomer sheet;

FIG. 5 is a side view of another embodiment of an environmental coating applied to an elastomer sheet;

FIG. 6 is a side view of another embodiment of an environmental coating applied to an elastomer sheet.

DETAILED DESCRIPTION OF THE DRAWINGS

Figure 1:
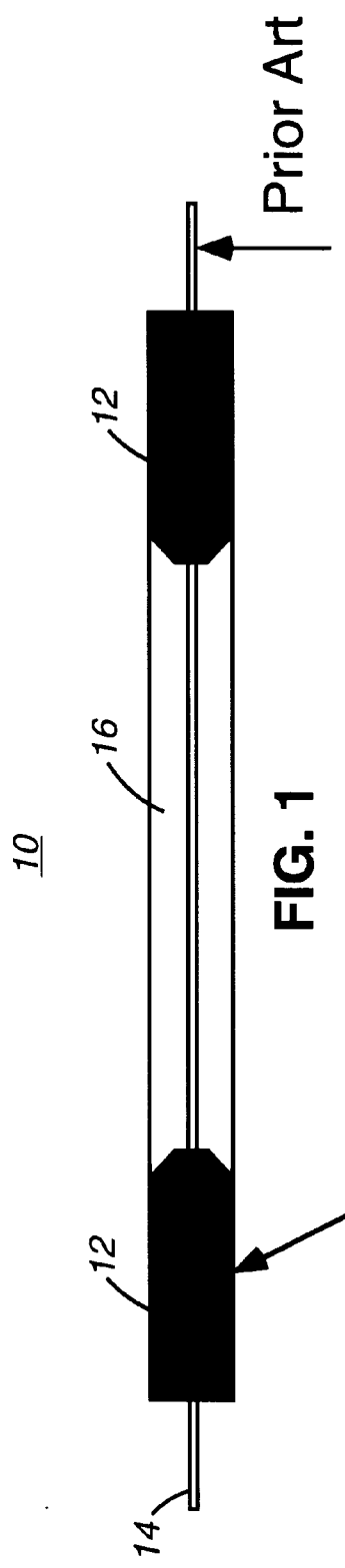
FIG. 1 is a side view of a prior art reinforced elastomer.
Figure 2:
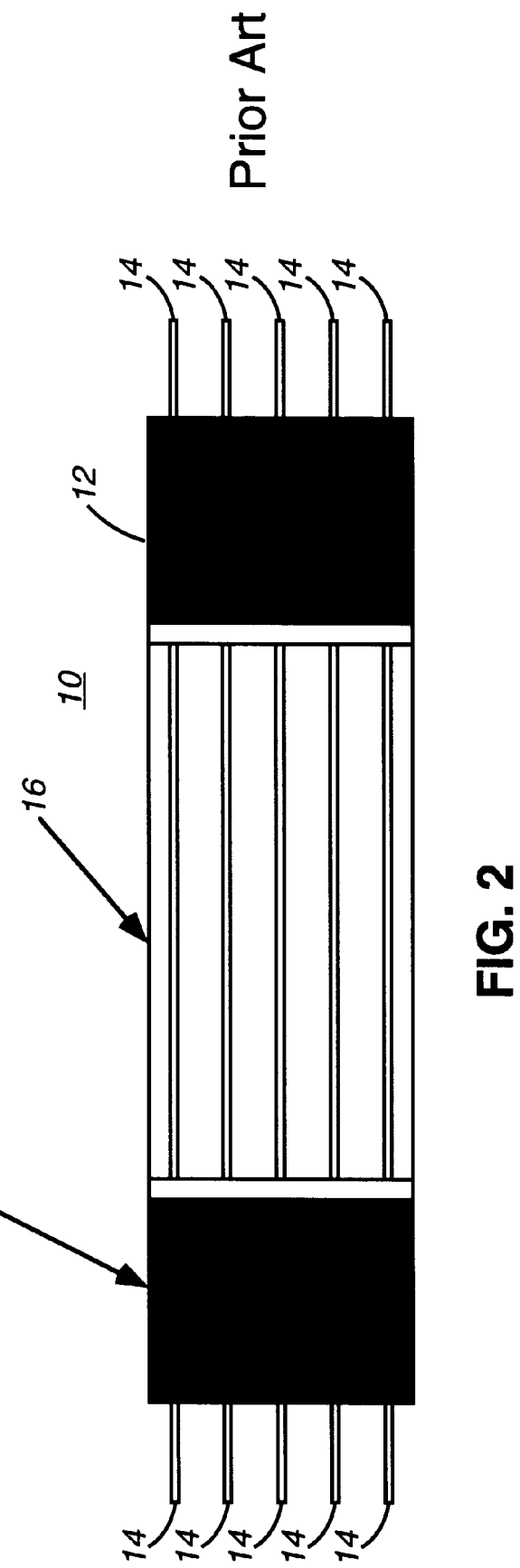
FIG. 2 is a top view of the rod reinforced elastomer of FIG. 1.
Figure 3:
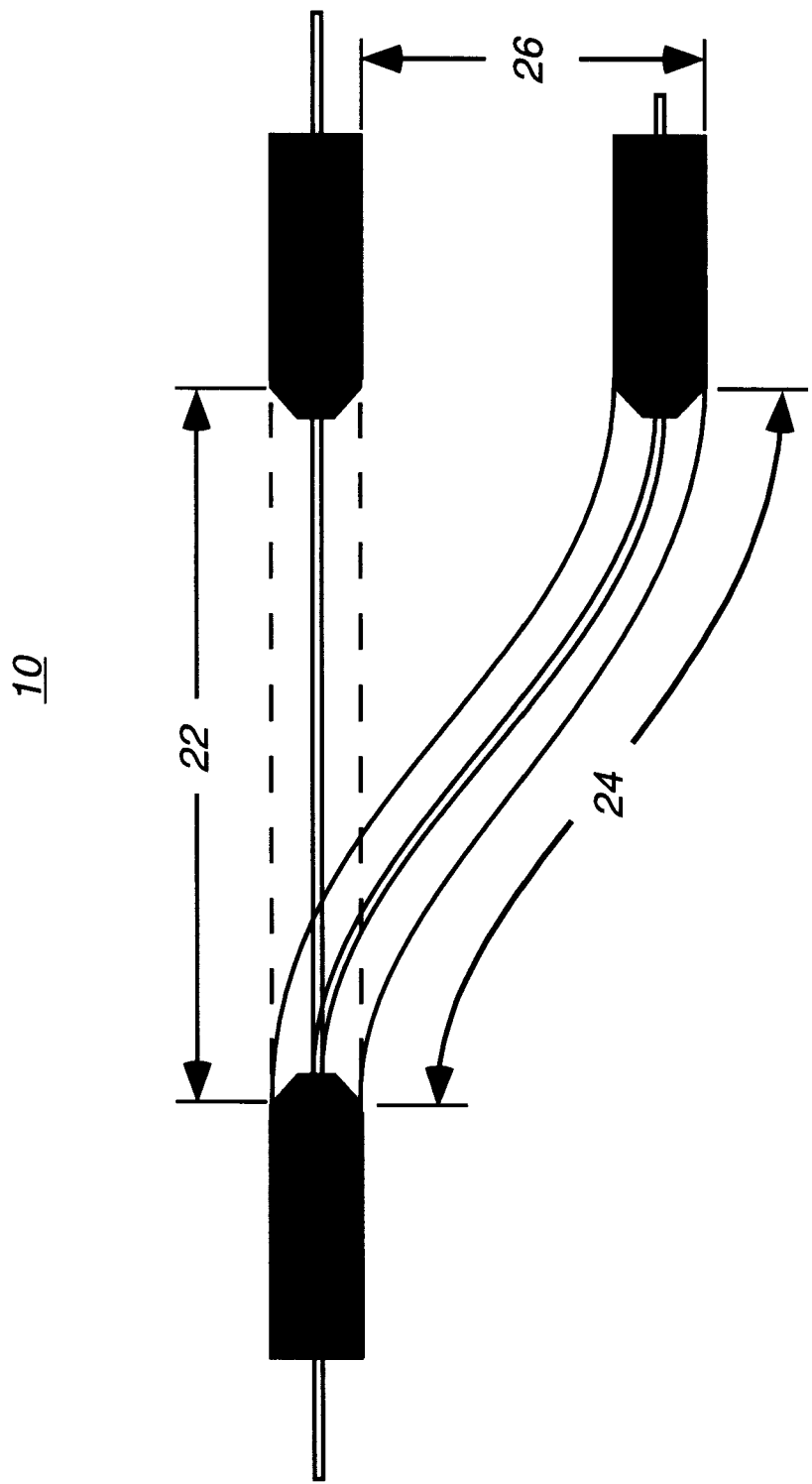
FIG. 3 is a side view of the rod reinforced elastomer of FIG. 1 in an elongated and deflected state.

An embodiment of an enviromental coating 50 attached to an elastomer sheet 52 is shown in FIG. 4. The environmental coating 50 has a fabric (knit fabric) 54 containing a plurality of fibers. In one embodiment the fabric is a warp knit fabric (warp knit style weave) made from polyamide Nylon fibers. In addition the fabric may contain a small amount of elastic polyurethane fiber (e.g., approximately 10%). The polyurethane or other elastic fiber assists in the recovery of the material after stretching. Note that the invention is not limited to nylon or to warp knit weave as other materials and weaves are available. For instance, tubular knit weaves or other weaves that permit reversible elongation without permanent deformation or fabric damage can be used and higher temperature resistant materials such as polyamide, glass and quartz fibers can be knit when necessary for increased thermal performance. The fabric 54 is coated with a conductive substance by electrolessly plating the fabric 54 in one embodiment. The electrolessly plating deposits from five to forty percent (by weight) silver, nickel, cooper, tin or other metal or combination of metals 56 on the fabric 54. In another embodiment each of the plurality of fibers forming the fabric 54 are electrolessly plated and then woven. An environmental sheet 58 is an elastomeric coating that can be in the form of the fluorosilicones, fluoroelastomers, silicones, thermoplastic elastomers, urethanes or other viable elastic materials. The environmental sheet 58 protects the elastomer sheet 52 from chemical solvents. An elastameric adhesive 60 is applied to a side of the environmental sheet 58 to attach the environmental coating 50 to the elastomer 52.

Tests have shown that the environmental coating is capable of a minimum of 100% elongation in all directions at the required operating temperature (operating range) (e.g., −65° to 250° Fahrenheit or −54° to 121° Centigrade). The environmental coating has a resistance of less than 0.8 Ohms per square, even when elongated and after repeated high strain loading conditions, providing an excellent ground plane. The tensile moduli for the material is less than 1,000 pounds per square inch (70.45 $Kg/cm^2$) over the operating conditions. A low tensile moduli is important when the environmental coating is placed on a reinforced elastomer. The low tensile moduli allows the reinforced elastomer to be elongated and deflected without requiring a large force to drive the reinforced elastomer. Placing the environmental coating over the reinforced elastomer also increases the tear resistance of the elastomer by two and half times.

FIG. 5 shows an alternative embodiment of the environmental coating 50. In this embodiment the fabric 54 only has the environmental layer 58 on the top surface of the fabric 54. The elastomeric adhesive is applied to a second surface of the fabric 54 or to the elastomer 52, to attach the environmental coating to the elastomer 52. FIG. 6 shows a third embodiment of a process for making and applying the environmental coating 50. In this embodiment the conductive fabric 54, 56 is prepared first. Next, the conductive fabric 54, 56 is cleaned with a solvent. Then an elastomeric adhesive 60 is applied to the elastomer sheet 52 and the fabric is placed on the adhesive 60.

Last, the environmental elastomeric sheet is applied by a sprayer 62.

Figure 7:
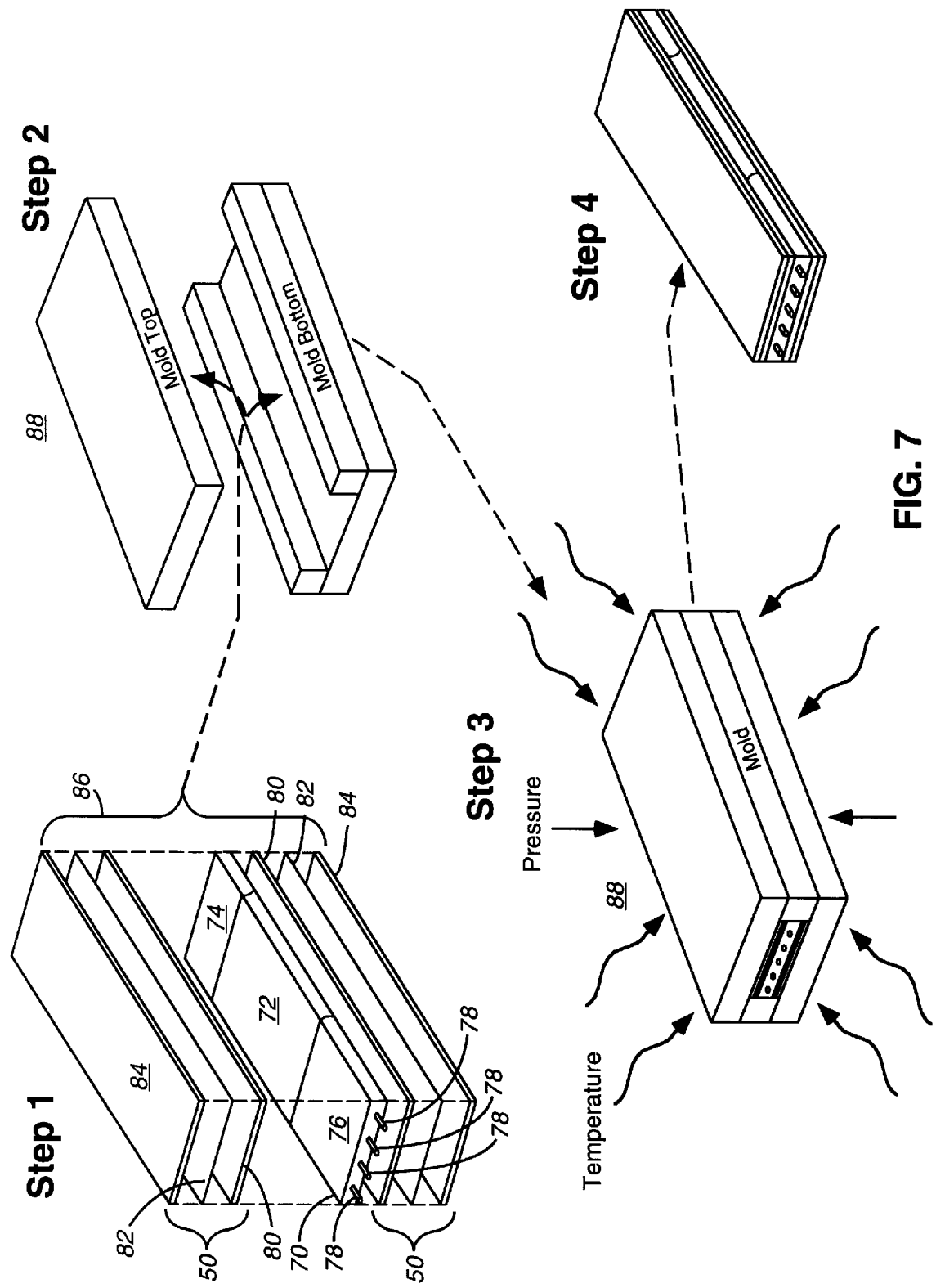
FIG. 7 is a schematic drawing of the process of forming another embodiment of an environmental coating applied to an elastomer panel.

FIG. 7 shows a process for forming another embodiment of the environmental coating 50 for an elastomer panel 70. The process involves first preparing the elastomer panel 70 by attaching a base elastomer sheet 72 to a pair of structural beams (pair of rigid members) 74, 76. A reinforcing member 78 is attached to one of the structural beams 74 and extends through the base elastomer sheet 72 and the other structural beam 76. Next a calendared elastomer layer 80 is placed over the base elastomer sheet 72 and the pair of structural blocks (pair of structural beams) 74, 76. The calendared elastomer is an uncured elastomer having a putty like consistency that can be molded. A knit fabric (stretchable fabric) 82 is then laid over the calendared elastomer 80. In one embodiment the knit fabric 82 is coated with an electrically conductive material. Finally, a calendared environmental layer 84 is placed over the knit fabric 82. The environmental coating protects the elastomer from chemical solvents.

The layers 70, 80, 82, 84 form a lay-up 86, which in one embodiment includes the same layers on the underside of the elastomer panel 70. The lay-up 86 is then placed in a mold 88. Heat and pressure are applied to the mold 88 at step 3. This cures the calendared elastomer 80 and the calendared environmental coating 84. It also causes the calendared elastomer (elastomer calendared sheet) 80 to attach to the base elastomer 72, to the structural blocks 74, 76, and the fabric 82. In addition, the curing causes the calendared enviromental coating (environmental calendared sheet) 84 to attach to the fabric 82. The process shown in FIG. 7 has the advantage of not needing an adhesive to attach the environmental coating 50 to the elastomer panel 70. In addition, the process of FIG. 7 is more easily manufactured. In another embodiment, the environmental coating 82 is manufactured separate from the elastomer panel 70.

Thus there has been described an environmental coating that protects the elastomer panel fram solvents and EMI. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An enviromental cover for a reinforced elastomer panel comprising:

a knit fabric covered with an electrically conductive material;

an enviromental calendared sheet applied to a first surface of the kit fabric; and an elastomer calendared sheet applied to a second surface of the knit fabric.

2. The environmental cover of claim 1, the environmental calendared sheet is uncured.

3. The environmental cover of claim 1, wherein the electrically conductive material is a metal.

4. An environmentally protected elastomer panel, comprising:

a pair of rigid members;

a base elastomer sheet connected between the pair of rigid markers;

a calendared elastomer layer covering a first side of the base elastomer sheet;

a stretchable fabric covering the calendared elastomer layer; and a calendared environmental layer covering the stretchable fabric.

5. The environmentally protected elastomer panel of claim 4 further including a reinforcing member inside the base elastomer sheet.

6. The environmentally protected elastomer panel of claim 4 wherein the stretchable fabric covering is coated with an electrically conductive material.

7. The environmentally protected elastomer panel of claim 4 further including a second calendared elastomer layer covering a second side of the base elastomer sheet.

8. The environmentally protected elastomer panel of claim 7 further including a second stretchable fabric covering the second calendared elastomer layer.

9. The environmentally protected elastomer panel of claim 8 further including a second calendared environmental layer covering the second stretchable fabric.

* * * * *